United States Patent
Diligenti et al.

(10) Patent No.: US 8,200,694 B1
(45) Date of Patent: Jun. 12, 2012

(54) IDENTIFICATION OF IMPLICITLY LOCAL QUERIES

(75) Inventors: Michelangelo Diligenti, Zurich (CH); Wenxin Li, Cupertino, CA (US); Fabio Lopiano, Sydney (AU); Trystan G. Upstill, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/942,008

(22) Filed: Nov. 8, 2010

Related U.S. Application Data (63) Continuation of application No. 11/781,858, filed on Jul. 23, 2007, now abandoned.

(51) Int. Cl.
*G06F 17/30* (2006.01)
(52) U.S. Cl. ...................................................... 707/769
(58) Field of Classification Search .................. 707/769, 707/999.003, E17.014, E17.069, E17.129; 709/216, 217
See application file for complete search history.

(56) References Cited

U.S. PATENT DOCUMENTS

| | | | |
|---|---|---|---|
| 5,265,065 A | 11/1993 | Turtle | |
| 5,410,688 A | 4/1995 | Williams et al. | |
| 6,285,999 B1 | 9/2001 | Page | |
| 6,321,227 B1 | 11/2001 | Ryu | |
| 6,449,765 B1 | 9/2002 | Ballard | |
| 6,526,440 B1 | 2/2003 | Bharat | |
| 6,601,100 B2 | 7/2003 | Lee et al. | |
| 6,745,248 B1 | 6/2004 | Gardos et al. | |
| 6,954,755 B2 | 10/2005 | Reisman | |
| 7,039,697 B2 | 5/2006 | Bayles | |
| 7,062,488 B1 | 6/2006 | Reisman | |
| 7,257,570 B2 | 8/2007 | Riise et al. | |
| 7,269,643 B2 | 9/2007 | Spaid | |
| 7,359,987 B2 | 4/2008 | Stahura | |
| 7,389,289 B2 | 6/2008 | Solaro et al. | |
| 7,403,939 B1 | 7/2008 | Virdy | |
| 7,472,160 B2 | 12/2008 | King et al. | |
| 7,543,055 B2 | 6/2009 | Kohn | |
| 7,680,796 B2 | 3/2010 | Yeh et al. | |
| 7,747,598 B2 | 6/2010 | Buron et al. | |
| 7,844,590 B1 | 11/2010 | Zwicky et al. | |
| 8,046,350 B1 | 10/2011 | Singhal et al. | |
| 2002/0156905 A1 | 10/2002 | Weissman | |
| 2002/0161901 A1 | 10/2002 | Weissman | |
| 2002/0173946 A1 | 11/2002 | Christy | |
| 2003/0009592 A1 | 1/2003 | Stahura | |
| 2003/0097357 A1 | 5/2003 | Ferrari et al. | |

(Continued)

OTHER PUBLICATIONS

Zhisheng et al., "Indexing implicit locations for geographical information retrieval," 2006, ACM, pp. 1-3.

(Continued)

*Primary Examiner* — Fred I Ehichioya
(74) *Attorney, Agent, or Firm* — Fish & Richardson P.C.

(57) ABSTRACT

Methods, systems, and apparatus, including computer program products, for identifying implicitly local queries. A query having one or more terms is received. The query is associated with a user locale. A degree of implicit local relevance for the query is determined. One or more search results for the query is received. Each received search result has a respective score and a respective result locale. The score of a respective search result is modified using the degree of implicit local relevance for the query, the user locale, and the respective result locale of the respective search result.

21 Claims, 6 Drawing Sheets

U.S. PATENT DOCUMENTS

| | | | |
|---|---|---|---|
| 2004/0019588 A1 | 1/2004 | Doganata et al. | |
| 2004/0111508 A1 | 6/2004 | Dias et al. | |
| 2005/0044065 A1* | 2/2005 | McArdle | 707/3 |
| 2005/0044139 A1 | 2/2005 | Christian et al. | |
| 2005/0055708 A1 | 3/2005 | Gould et al. | |
| 2005/0065916 A1 | 3/2005 | Ge et al. | |
| 2005/0071465 A1 | 3/2005 | Zeng et al. | |
| 2005/0125391 A1 | 6/2005 | Curtis et al. | |
| 2005/0154716 A1* | 7/2005 | Watson et al. | 707/3 |
| 2005/0203875 A1 | 9/2005 | Mohammed et al. | |
| 2006/0041562 A1 | 2/2006 | Paczkowski et al. | |
| 2006/0161534 A1 | 7/2006 | Carson et al. | |
| 2006/0262786 A1 | 11/2006 | Shimizu et al. | |
| 2006/0287985 A1 | 12/2006 | Castro et al. | |
| 2007/0011168 A1 | 1/2007 | Keohane et al. | |
| 2007/0043816 A1 | 2/2007 | Ishibashi | |
| 2007/0050586 A1 | 3/2007 | Shin et al. | |
| 2007/0050708 A1 | 3/2007 | Gupta et al. | |
| 2007/0083505 A1 | 4/2007 | Ferrari et al. | |
| 2007/0234116 A1 | 10/2007 | Yoshikawa et al. | |
| 2007/0234216 A1 | 10/2007 | Fitzpatrick et al. | |
| 2007/0234351 A1 | 10/2007 | Iyoda et al. | |
| 2007/0239713 A1 | 10/2007 | Leblang et al. | |
| 2007/0283273 A1 | 12/2007 | Woods | |
| 2007/0283422 A1 | 12/2007 | Iyoda et al. | |
| 2007/0294391 A1 | 12/2007 | Kohn | |
| 2008/0005104 A1 | 1/2008 | Flake et al. | |
| 2008/0005127 A1 | 1/2008 | Schneider | |
| 2008/0010273 A1 | 1/2008 | Frank | |
| 2008/0021874 A1 | 1/2008 | Dahl et al. | |
| 2008/0052358 A1 | 2/2008 | Beaven et al. | |
| 2008/0133612 A1 | 6/2008 | Liu et al. | |
| 2008/0172344 A1 | 7/2008 | Eager et al. | |
| 2008/0172374 A1 | 7/2008 | Wolosin et al. | |
| 2008/0189290 A1 | 8/2008 | Kim et al. | |
| 2008/0195603 A1 | 8/2008 | Gross et al. | |
| 2008/0209552 A1 | 8/2008 | Williams et al. | |
| 2008/0222307 A1 | 9/2008 | Bhakta et al. | |
| 2008/0243821 A1 | 10/2008 | Delli Santi et al. | |
| 2008/0250136 A1 | 10/2008 | Izrailevsky et al. | |
| 2008/0294602 A1 | 11/2008 | Permandla et al. | |
| 2008/0317217 A1 | 12/2008 | Bernardini et al. | |
| 2009/0012866 A1 | 1/2009 | Celik et al. | |
| 2009/0077221 A1 | 3/2009 | Eisenstadt et al. | |
| 2009/0196122 A1 | 8/2009 | Crowell | |
| 2010/0287049 A1 | 11/2010 | Rousso et al. | |

OTHER PUBLICATIONS

Hursh, "Local Search: The Relevance Dilemma," Jan. 18, 2007, ClickZ, pp. 1-3.

* cited by examiner

| Term | English/US | English/UK | English/AU | English/JP | German/DE | German/US |
|---|---|---|---|---|---|---|
| restaurant | 0.70 | 0.70 | 0.70 | 0.10 | 0.40 | -0.5 |
| football association | -0.70 | 0.90 | 0.40 | 0.40 | 0 | 0 |
| linux | 0 | 0 | 0 | 0 | 0 | 0 |
| freedom | 0.50 | 0.50 | 0.90 | -0.30 | 0 | 0 |
| flughafen | -0.90 | -0.90 | -0.90 | -0.95 | 0.90 | -0.10 |

IDENTIFICATION OF IMPLICITLY LOCAL QUERIES

CROSS-REFERENCE TO RELATED APPLICATIONS

This application is a continuation application of and claims priority to U.S. application Ser. No. 11/781,858, filed on Jul. 23, 2007.

BACKGROUND

The subject matter of this specification relates generally to search systems.

A search service, e.g., a web-based search service, will generally receive a search query from a user through a user interface presented to the user by the service through a web browser on a personal computing device. Upon receiving a search query, a search service will generally direct the search query to a search engine for a specific corpus of resources. A search engine produces search results based on the query. The search engine ranks the search results based on their relevance to the query in the context of the corpus to which the query was directed.

Each resource identified in the search results may include one or more of the following attributes: a title of a webpage, a hyperlink to the webpage, a snippet of text showing search terms in bold, the size of the webpage, a hyperlink to similar webpages, and a hyperlink to a cached version of the webpage. After the search engine produces the search results, the search service presents those search results to the user.

If a user is interested in search results from a particular locale, the user can include terms specifying a locale in a query, or include a restriction that only search results from a particular locale should be returned.

SUMMARY

In general, one aspect of the subject matter described in this specification can be embodied in methods that include the actions of receiving a query having one or more terms, where the query is associated with a user locale, determining a degree of implicit local relevance for the query, receiving one or more search results for the query, where each search result has a respective score and a respective result locale, and modifying the score of a respective search result using the degree of implicit local relevance for the query, the user locale, and the respective result locale of the respective search result. Other embodiments of this aspect include corresponding systems, apparatus, computer readable media, and computer program products.

In general, another aspect of the subject matter described in this specification can be embodied in methods that include the actions of identifying a collection of terms, determining a degree of implicit local relevance for each term in the collection with respect to each of one or more locales, including evaluating each term in the collection with respect to one or more local relevance criteria, and storing the collection and the determined degrees of implicit local relevance in a repository. The terms in the collection are terms identified from search queries. A degree of implicit local relevance for a respective term with respect to a locale indicates a correlation of search queries that include the respective term with search results that are directed to the locale. Other embodiments of this aspect include corresponding systems, apparatus, computer readable media, and computer program products.

Particular embodiments of the subject matter described in this specification can be implemented to realize one or more of the following advantages. A user can receive search results emphasizing local results without explicitly specifying a locale in the query or without restricting the search results returned for a query to search results that are associated with a particular locale. A search engine can identify search queries that carry an implicit preference for local search results and promote local search results for these queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
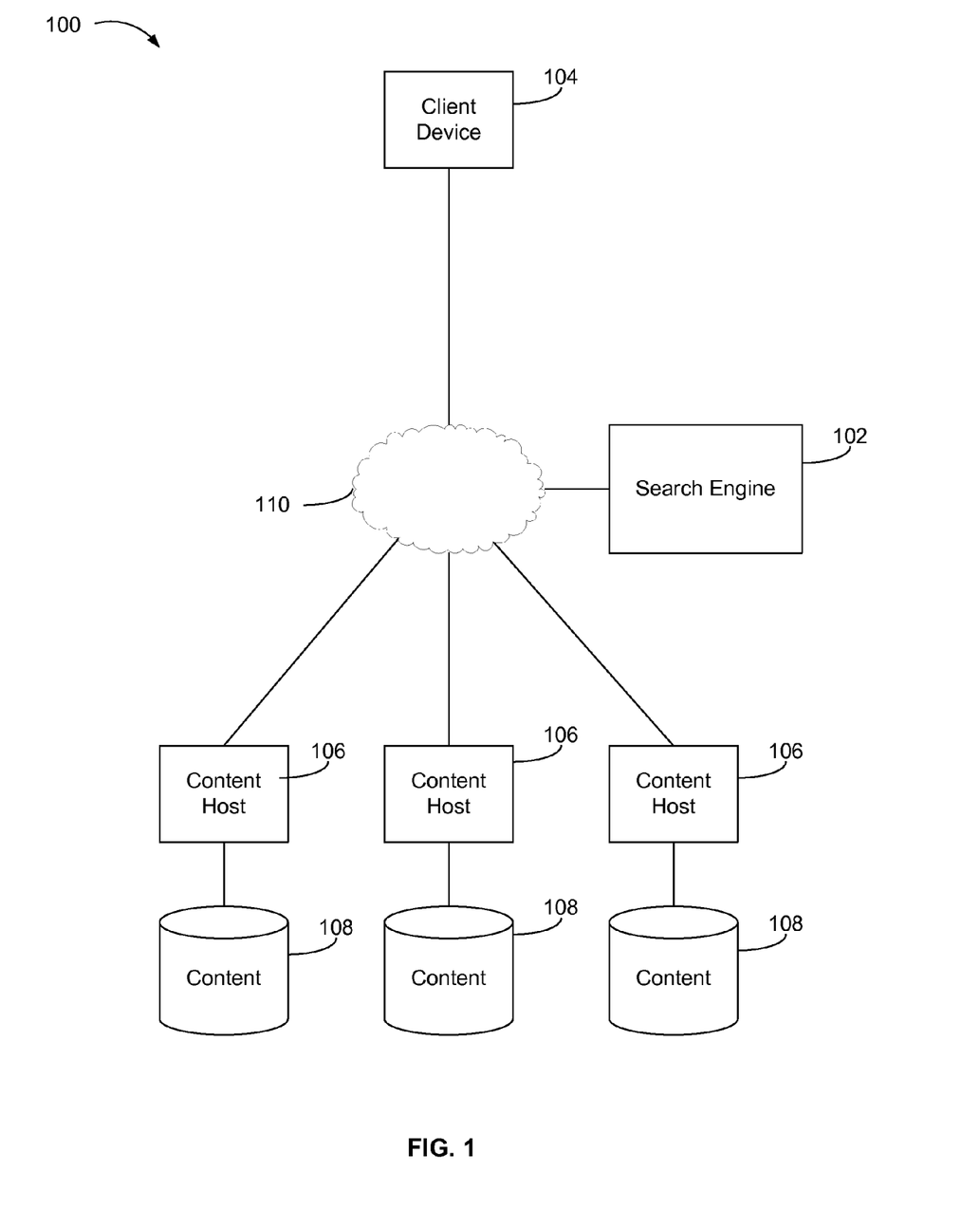
FIG. 1 illustrates an example search engine for providing search services.

FIG. 1 shows an example system 100 for providing search services. The system 100 includes a search engine 102. The search engine 102 identifies content 108 hosted by content hosts 106 (e.g., by crawling the content hosts 106) though a network 110. The search engine 102 indexes the content 108.

The search engine 102, or other application associated with the search engine 102, provides a user interface through which users can submit search queries for content to the search engine 102. A search query (or "query") includes one or more terms (e.g., words, phrases, numbers, etc.). The user can also optionally provide one or more additional parameters that specify additional search criteria (e.g., a date restriction, language restriction, domain restriction, etc.). For example, check boxes in the user interface can be indicated to apply a particular search criterion.

Users access the search engine user interface through a client device 104 (e.g., using a web browser on the client device 104). In response to queries submitted by users, the search engine 102 presents search results that satisfy the queries. The search results can include links to content that have been indexed by the search engine 102 and which satisfy the queries. In some implementations, the search engine 102 also stores copies of the indexed content and presents the copies upon request.

Content hosts 106 include content 108. The content hosts 106 can present content 108 to users through the network 110. Content 108 can include various resources, including, for example, documents (e.g., webpages, plain text documents, Portable Document Format (PDF) documents, images), video or audio clips, and other resources. In some implementations, the content hosts 106 are web servers and the content 108 includes webpages written in the Hypertext Markup Language (HTML) or any language suitable for authoring webpages.

As used in this specification, the term "search results" or "results" refers to resources that satisfy a search query, or information generated by a search engine that identifies such resources.

A resource can be determined to be associated with one or more locales. A locale is a geographic subdivision of the world. In some implementations, a locale is a country or any subdivision of a country (e.g., state, province, county, city, municipality, district, etc.). In some implementations, locales also include groups of countries (e.g., political unions of countries, groups of countries having a common cultural heritage, countries within particular regions, etc.).

A resource can be determined to be associated with a locale according to the particular content of the resource. A resource including information specific to a particular locale can be determined to be associated with that locale. For example, a resource can be a webpage listing a business and its address. As a result, the resource can be determined to be associated with the locale in which the business is located, as indicated by the address of the business.

A resource can include metadata identifying one or more locales with which the resource is associated. For example, the HTML code of a webpage can include metadata specifying one or more locales with which the webpage is associated.

A resource can also be determined to be associated with a locale based on other factors. In some implementations, a resource is determined to be associated with a locale based on a domain in which the resource is hosted. For example, a resource hosted in the ".uk" country code top-level domain (ccTLD) can be determined to be associated with the United Kingdom.

In some implementations, a resource is determined to be associated with one or more locales, all locales, or no particular locale. In some implementations, a resource that is determined to be associated with all locales or no particular locale is said to be "globally relevant." In some other implementations, association with all locales and association with no particular locale are distinct; association with all locales is referred to as "globally relevant". Determining a locale associated with a resource can include identifying one or more indicators associated with the resource. The indicators can include, for example, IP address and TLD associated with the resource as well as user traffic associated with the resource (e.g., click records). An example technique for determining a locale association of a resource is disclosed in U.S. patent application Ser. No. 11/781,860, titled "Locale Identification for Domains and Domain Content Background," filed Jul. 23, 2007, which is incorporated by reference herein in its entirety.

A query can be associated with a user locale. A user locale of a query is a locale in which the user submitting the query is likely to be located or a locale in which the user is likely to be interested. Identification of a user locale for a query is described in greater detail below.

A query includes one or more terms (e.g., words, phrases, numbers, etc.) and optionally one or more additional parameters that specify additional search criteria (e.g., date restriction, language restriction, or domain restriction). A query can include terms that explicitly specify a locale. For example, the query "restaurant chicago" includes a term "chicago" that explicitly specifies the locale of Chicago. By explicitly specifying the locale "chicago", the query indicates an interest in search results relevant to or associated with the locale of Chicago.

A locale restriction can also be included with a query that does not include terms specifying a locale. For example, the query "restaurant" does not include a term that explicitly specifies a locale, but a domain restriction parameter can be included with the query. The domain restriction parameter can restrict the search results presented for the query to search results hosted in a ccTLD (e.g., restriction to results hosted in the ".de" (Germany) ccTLD). The ccTLD domain restriction does not specify a locale per se, but it indicates a locale in which the user submitting the query is interested.

A query can be recast into a canonical query. A canonical query includes stem forms of one or more of the terms of the query. A stem form of a term is a standard form of the term. For example, if the term is a verb, the infinitive form is the stem form of the verb. As another example, if the term is a common noun, the singular form of the noun is the stem form of the noun (e.g., "restaurant" is the stem form of "restaurants").

In some implementations, the canonical query can include synonyms in addition to the one or more of the terms in the query. The synonyms can include terms with the same meaning, acronyms, and/or alternative forms of a term. In some implementations, the synonyms and the corresponding query term are grouped together in a Boolean OR expression in the canonical query. For example, if the query is "car dealer" (i.e., "car AND dealer") and synonyms for "car" are "auto" and "automobile", then the canonical query is "(car OR auto OR automobile) dealer".

In some implementations, the canonical query does not include any stopwords (e.g., "and," "the," prepositions, etc.) that were in the original query. For example, if the query is "the european union," the canonical query is "european union".

In some implementations, a query is recast into a canonical query by recasting the terms in the query into canonical terms. Each canonical term includes the stem form of the term, without any stopwords, and optionally including one or more synonyms for the term.

A query can be associated with a particular language. In some implementations, the language associated with the query is the language of the search engine user interface through which the user submitted the query. For example, if the user submitted a query using an English language search engine user interface, the query is associated with the English language. If the user submitted the query using a French language user interface, the query is associated with the French language.

Figure 2:
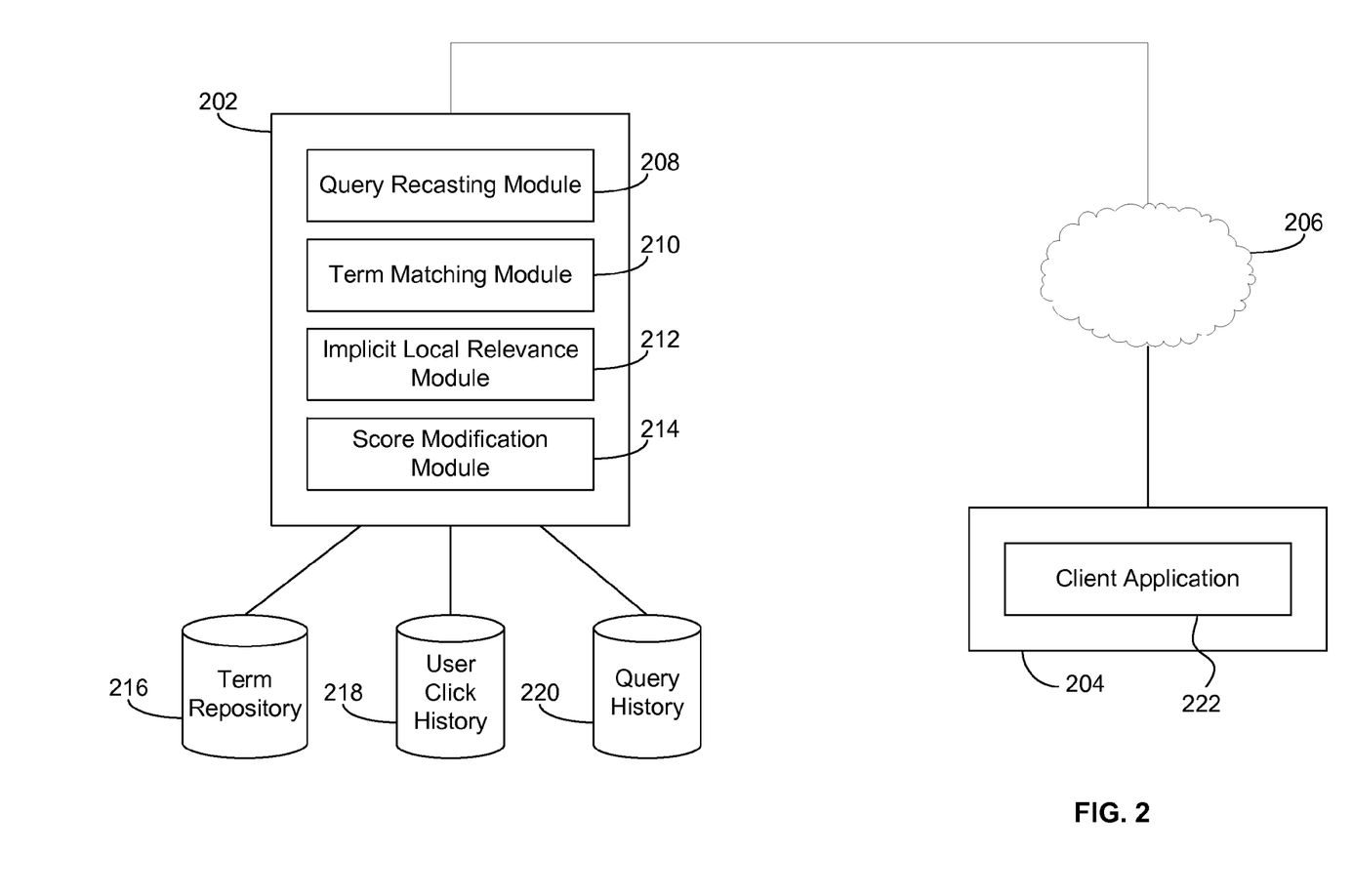
FIG. 2 is a block diagram of an example search engine server and an example client device.

FIG. 2 is a block diagram illustrating an example search engine server 202 and a client device 204. The search engine server 202 is coupled to a client device 204 by one or more networks 206. The one or more networks 206 can include, for example, local area networks (LAN), wide area networks (WAN), intranets, wireless networks, and the Internet.

The search engine server 202 includes a query recasting module 208, a term matching module 210, an implicit local relevance module 212, and a score modification module 214. The query recasting module 208 recasts queries received by search engine server 202 into canonical queries. The term matching module 210 matches terms in queries to terms in a term repository 216. The implicit local relevance module 212 determines a degree of implicit local relevance for a group of terms in a query. Determining a degree of locale relevance a term is described in greater detail below. The score modification module 214 modifies a score of a search result received in response to a query using a user locale, a locale of the search result, and a degree of implicit local relevance of a query.

The search engine server 202 also includes a term repository 216, a user click history 218, and query history 220. The term repository 216 includes a collection of terms that have been included in past search queries received by search engine server 202. The term repository 216 also includes corresponding degrees of implicit local relevance for each term in the collection of terms with respect to one or more distinct locales. The user click history 218 includes the histories of selections of search results by a collection of users, who can be in different locales. The query history 220 includes the history of queries submitted by users to the search engine. Search engine server 202 can gather the click histories of users by monitoring the users' selection of search results. Search engine server 202 can gather the query history by monitoring the queries submitted by the collection of users.

The client device 204 includes a client application 222. A user at client device 204 can access an interface of the search engine server 202 through the client application 222. In some implementations, the client application 222 is a web browser application.

Figure 3:
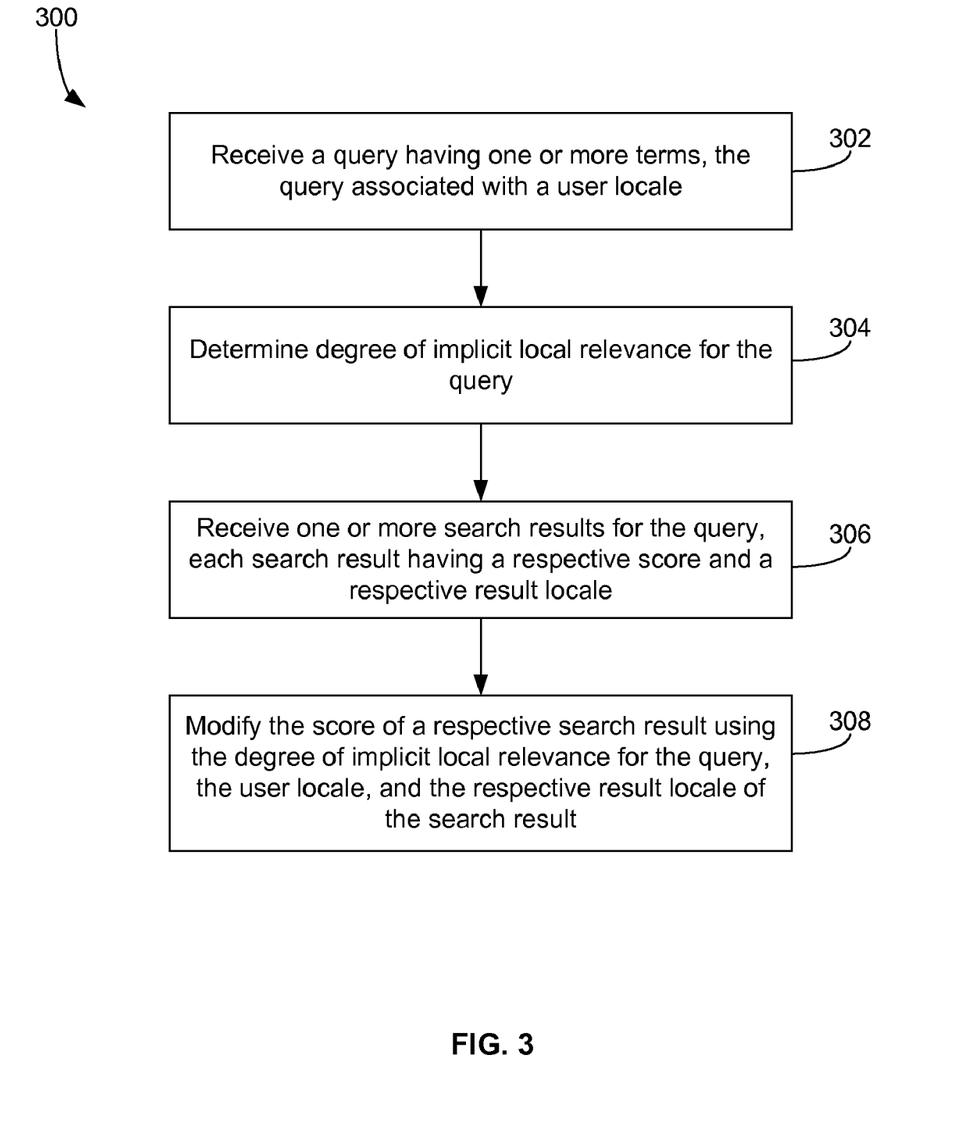
FIG. 3 is a flow diagram illustrating an example process for modifying a score of a search result using a degree of implicit local relevance.

FIG. 3 is a flow diagram illustrating a process 300, which is an example of processes that can be used for modifying a score of a search result using a degree of implicit local relevance. For convenience, the process 300 will be described with reference to a computer system that performs the process. The system receives a query having one or more terms (302). The query is submitted by a user, for example, through a search engine user interface.

The received query has a user locale. The user locale provides an indication of the locale in which the user who submitted the query is likely to be located or a locale in which the user is likely to be interested.

In some implementations, a user locale of the query is identified according to a user input specifying a locale. For example, the search engine user interface can allow the user to explicitly specify a user locale. The user can specify a locale for an individual query or can specify a locale within a user profile that is applied to multiple queries.

In some other implementations, a user locale of the query is identified according to a domain of the search engine user interface in which the user submits the query. A search engine can include user interfaces hosted in multiple domains, including multiple country code top-level domains (ccTLDs). For example, a user locale of the United Kingdom is identified for a user who accesses the search engine and submits a query at a user interface with the Universal Resource Locator (URL) including, for example, "searchengine.co.uk". As another example, a user locale of Germany is identified for a user who accesses the search engine and submits a query at a user interface with the URL including, for example, "searchengine.de".

The system determines a degree of implicit local relevance for the received query (304). In some implementations, the degree of implicit local relevance for the query is determined by determining a degree of implicit local relevance for a group of one or more terms in the query. The degree of implicit local relevance for the group of terms is a combination of the respective degrees of implicit local relevance for each term in the group of terms. In some implementations, the respective degrees of implicit local relevance of the terms in the group of terms are multiplied together to get the degree of implicit local relevance for the group of terms. In some other implementations, the respective degrees of implicit local relevance of the terms in the group of terms are summed together to get the degree of implicit local relevance for the group of terms. In further implementations, the degree of implicit local relevance for the group of terms is a mean (weighted or not) or a median of the degrees of implicit local relevance of the terms in the group of terms.

In some implementations, determining the degree of implicit local relevance for a group of terms include matching each term in the group of terms to a respective term in a repository of terms (e.g., term repository 216). For each term in the group of terms that match a respective term in the repository, a degree of implicit local relevance for that term is identified from the term repository.

In an exemplary implementations, a term in the group of terms is recast into a canonical term (e.g., by recasting the term into its stem form and optionally adding synonyms of the term) and the canonical term (including synonyms) is compared to the repository of terms to look for a match. In another exemplary implementation, the entire query is recast into a canonical query (e.g., by removing stopwords, recasting terms in the query to their respective stem forms) and terms in the canonical query are compared against terms in the repository of terms for matches. Identifying degrees of implicit local relevance for terms in a repository is described in greater detail below.

The degree of implicit local relevance for a term, a group of terms, or a query can be represented as a number value within a specified range. In some implementations, a degree of implicit local relevance is a value between 0 and 1, inclusive, where 0 indicates neutrality regarding a preference for local results (i.e., search results local to the user locale of the query), and 1 indicates a high implicit preference for local search results. In some other implementations, a degree of implicit local relevance is a value between −1 and 1, inclusive, where 0 indicates neutrality regarding a preference for local results, 1 indicates a high implicit preference for local search results, and −1 indicates a high implicit preference for global search results. The degree of implicit local relevance can vary for different locales as described in further detail below with reference to FIG. 4.

The system receives one or more search results to the query (306). The search results identify resources that satisfy the query. Each search result (more particularly, the resource identified by the respective search result) is associated with a score and with one or more result locales. The score of a result rates the quality and importance of the result. In some implementations, the score of a search result is a combination of an information retrieval score and a score that measures the importance of a resource based on a network of hyperlinks to and from the resource. In some implementations, the information retrieval score of a resource is a score calculated according to multiple factors related to the quality of a result. For example, the information retrieval score of a resource can be calculated based on anchor text of inbound links to a resource, the prominence of the search query terms in the resource, and so forth. In some other implementations, the score of a result is based on other factors.

Each result is associated with one or more result locales. A result locale of a search result is a locale to which a search result is considered relevant. For example, if the result is the homepage of a business, the result is relevant to the locale in which the business is located. In some implementations, a result locale of a result is identified based on any of the content of the result, metadata associated with the result, and a host domain of the result. Examples of techniques for identifying a result locale of a search result are disclosed in U.S. patent application Ser. No. 11/781,843, titled "Identification and Promotion of Local Search Results," filed Jul. 23, 2007, and in U.S. patent application Ser. No. 11/781,860, titled "Locale Identification for Domains and Domain Content Background," filed Jul. 23, 2007, which are incorporated by reference herein in their entirety.

For each of the search results, the system modifies the score of the respective result using the degree of implicit local relevance of the query, the user locale, and the result locale of the respective result (308). A score of a search result can be modified based on whether the result locale matches the user locale and the value of the degree of implicit local relevance of the query.

In some of the implementations the system uses a 0 to 1 range for the degree of implicit local relevance. A score of a search result can be increased by an amount that is a function of the degree of implicit local relevance of the query. The increase is larger for larger degrees of implicit local relevance. If the degree is 0, scores of search results are not modified.

In some others of the implementations that use the 0 to 1 range for the degree of implicit local relevance, the score of a search result can be increased if the degree of implicit local relevance of the query is above a threshold, and the amount of the increase is a function of the degree of implicit local relevance of the query. For example, if the threshold is 0.20, and the degree of implicit local relevance is 0.10, scores of search results are not modified. If the degree of implicit local relevance is 0.60, a score of a search result that is otherwise eligible for a score increase can be increased by an amount that is a function of the degree of implicit local relevance.

In some of the implementations the system uses a −1 to 1 range for the degree of implicit local relevance. If the degree of implicit local relevance is positive (i.e., the query has some implicit preference for local results), the scores of one or more search results whose respective result locales match the user locale can be increased. If the degree of implicit local relevance is negative (i.e., the query has some implicit preference for global results), the scores of one or more search results that are globally relevant can be increased, and optionally the scores of one or more search results that are local to particular locales can be decreased. If the degree is 0, scores of search results are not modified.

In some other implementations using a −1 to 1 range for the degree of implicit local relevance, if the degree of implicit local relevance is within a certain threshold range (e.g., −0.2 to 0.2, inclusive), scores of search results are not modified. If the degree of implicit local relevance is positive and outside the threshold range, the scores of one or more search results whose respective result locales match the user locale can be increased. If the degree of implicit local relevance is negative and outside the threshold range, the scores of one or more search results that are globally relevant can be increased, and optionally the scores of one or more search results that are local to particular locales can be decreased.

The score of a search result can be modified by applying a score modifier to the score. In some implementations, the score modifier is a multiplier. The value of the multiplier is a function of the degree of implicit local relevance of the query. For example, if the degree of implicit local relevance of the query is positive and the result locale matches the user locale, the value of the multiplier is larger for larger degrees of implicit local relevance. In some other implementations, the score modifier is an additive modifier that can be added to the score. The value of the additive score modifier is, similar to the multiplicative score modifier, a function of the degree of implicit local relevance of the query.

In an exemplary implementation, a query, search results to the query, and scores of the search results are received. A user locale of the query is identified and respective result locales of the search results are identified. One or more locales related to the user locale are determined. If the result locale of a result is one of the locales related to the user locale (i.e., the result is local), the score of the result may be increased by a multiplicative or additive score modifier, where the value of the score modifier is a function of at least the degree of implicit local relevance of the query. The degree of implicit local relevance of the query affects how much of an increase the score of a search result can receive. The increase can be larger if the query has a stronger implicit preference for local results. An example of a procedure for determining related locales and comparing the related locales to result locales is disclosed in U.S. patent application Ser. No. 11/781,843, titled "Identification and Promotion of Local Search Results," filed Jul. 23, 2007, which is incorporated by reference herein in its entirety.

In some implementations, if the query received at block 302 explicitly specifies a locale and/or includes a locale restriction, blocks 304 and 308 can be skipped. A determination of a degree of implicit local relevance for the query is not necessary when the query explicitly indicates a locale preference.

Figure 4:
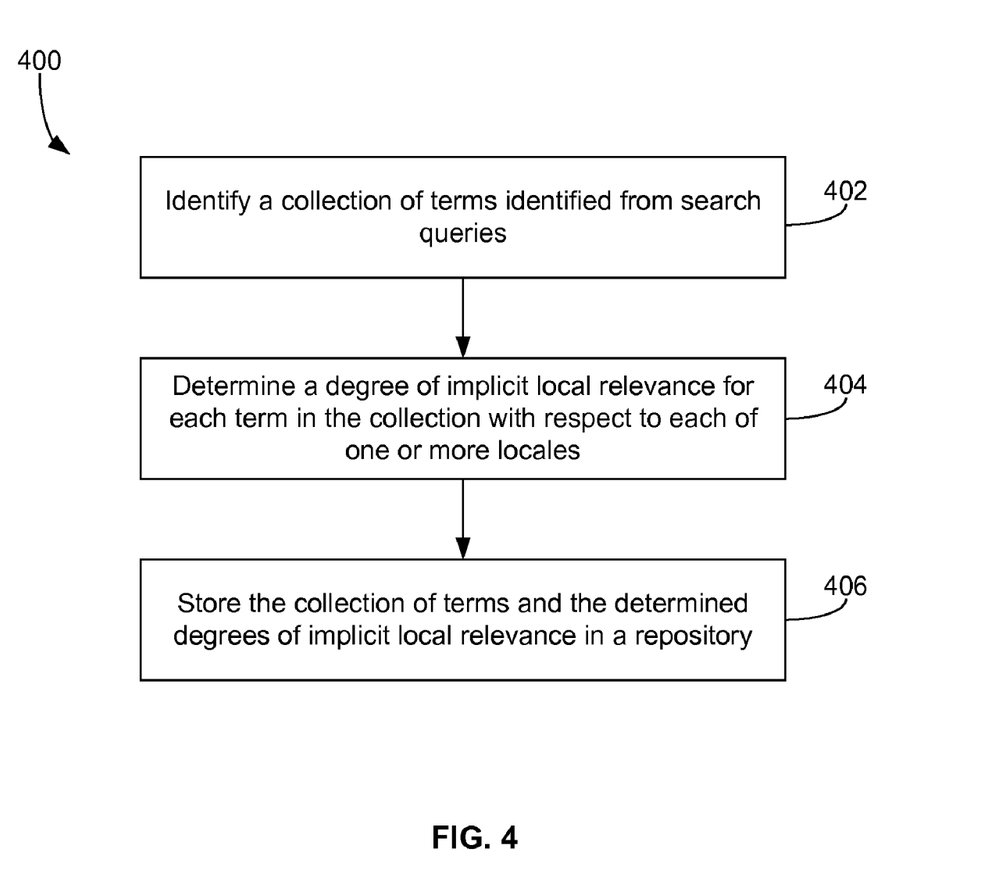
FIG. 4 is a flow diagram illustrating an example process for determining degrees of implicit local relevance for terms in a repository of terms.

FIG. 4 is a flow diagram illustrating an example process 400 for determining degrees of implicit local relevance for terms in a collection of terms. For convenience, the process 400 will be described with reference to a computer system (e.g., the server 150) that performs the process. The system identifies a collection of terms (402). The collection of terms includes one or more terms that are identified from search queries. In some implementations, the collection excludes terms that are names of locales. That is, the collection does not include names of countries, states, provinces, cities, and the like.

In some implementations, the terms in the collection are identified from queries received by a search engine over time from a population of users and inserted into the collection when first received. The terms in the collection include terms from canonical forms of queries. In an exemplary implementation, when a query is received, the query is recast into a canonical query. If a term in the canonical query is not in the collection, that term is inserted into the collection.

The system determines a degree of implicit local relevance for each term in the collection with respect to one or more locales (404). A respective degree of implicit local relevance is determined for each term, with respect to each locale. Thus, the terms of a given query can have different degrees of implicit local relevance for different locales.

The collection of terms and the determined degrees of implicit local relevance are stored in a repository (406).

As described above, a query includes one or more terms. The terms of the query may have significance in some languages but not in other languages. Whether a term has significance in a language may impact whether a term carries an implicit preference for local results. For example, the term "tax" is a word in English but not in Spanish; it is unlikely that a query "tax" carries an implicit preference for local results in a predominantly Spanish-speaking country. Alternatively, the term may mean different things and have different levels of significance depending on the language and/or locale. For example, the English term "freedom" is a generic term in English-speaking countries (e.g., United States, Canada, Australia), but the same term also has local significance in Australia because it is also the name of a prominent Australian home furnishings business.

In some implementations, a degree of implicit local relevance is determined, for a term, with respect to each of one or more languages, to account for differences between languages. The degree of implicit local relevance of a term with respect to a language becomes the degree of implicit local relevance of the term with respect to all locales (e.g., countries) that have the language as an official or otherwise common or predominant language. For example, if the degree of implicit local relevance of a term is 0.7 with respect to English and 0.1 with respect to German, then the degree of implicit local relevance with respect to English-speaking countries (e.g., United States, United Kingdom, Australia) is 0.7, and the degree of implicit local relevance with respect to German-speaking countries (e.g., Germany, Austria) is 0.1. A country with multiple official or dominant languages can have individual degrees of implicit local relevance with respect to each of its official or dominant languages.

In some implementations, the degree of implicit local relevance that is identified for a query (304, FIG. 3) is a degree of implicit local relevance of the query with respect to a user locale of the query. If the user locale of a query is Canada, for example, the degree of implicit local relevance of the query is the degree with respect to Canada. The degree of implicit local relevance for a query is a combination (e.g., a product, a sum, a mean) of the degrees, with respect to Canada, of the terms in a group of one or more terms in the query.

In some other implementations, the degree of implicit local relevance that is identified for a query (304, FIG. 3) is a degree of implicit local relevance of the query with respect to a combination of the user locale and a language of a search engine user interface from which the query was received. If the user locale of a query is Canada and the search engine use interface in which the query was submitted is French, for example, the degree of implicit local relevance of the query is the degree with respect to a French-Canada combination. If the user locale of the query is Canada and the search engine user interface in which the query was submitted is English, for example, the degree of implicit local relevance of the query is the degree with respect to an English-Canada combination.

In some other implementations, a degree of implicit local relevance is determined, for a term, with respect to each of one or more language-locale combinations. In some implementations, the language-locale combinations are language-country combinations. In these implementations, the degree of implicit local relevance is determined using both the language used in a locale and the differences in meaning and significance of a term between locales. As a result, different locales can have different degrees of implicit local relevance even if those locales speak the same language.

A degree of implicit local relevance for a term can be determined using one or more criteria. A term is evaluated against the one or more criteria. From the evaluation, degrees of implicit local relevance can be determined.

One criterion can be whether a collection of users, who over time included the term in queries, tend to select search results that are associated with locales near or related to the locales of the users. If the collection of users, over time, select at a statistically significant rate local results for a query including a term, that is an indication that the term carries some implicit preference for local results. In some implementations, this criterion is evaluated for a term by reviewing the click histories of multiple users for queries with the term. The degree of implicit local relevance of a term is greater if the click histories indicate that for queries including the term, the collection of users select local results at a higher rate.

Another criterion can be whether a term is combined in queries with explicit specifications of locales at a statistically significant rate. For example, if the term "tax" is included with specified locales in queries (e.g., "tax canada", "tax germany", "france tax") at a statistically significant rate, then that is an indication that the term "tax" carries some implicit preference for local results. In some implementations, this criterion is evaluated for a term by reviewing the query history of a search engine. The degree of implicit local relevance of a term is greater if the term appears in queries with specified locales at a higher rate.

Yet another criterion is whether the queries including the term also include a locale domain restriction (e.g., a domain restriction where the domain is a ccTLD or is a sub-domain of a ccTLD) at a statistically significant rate. A user can include in a query a restriction that the search results returned for the query be in a specified domain associated with a locale. The degree of implicit local relevance of a term is greater if the term appears in queries that include locale domain restrictions at a higher rate.

Another criterion that can be used is whether, for queries that include a term, users transition from non-local or general (i.e., not local to any particular locale) search results to local results or content within a predefined number of transitions. In some implementations, a transition is a click or a selection to go from one document (e.g., a web page) to another document. For example, if a user first selects a non-local result to a query including the term, and then ends up navigating to a local result within five pages, this is an indication that local results are more useful for the term than non-local results, and thus the term has some implicit preference for local results.

Another criterion is the frequency of occurrence of a term in content. If a term frequently occurs throughout content of particular locales, the term may be determined to carry some implicit preference for local results when used in a query. For example, if a term frequently appears in content associated with the United Kingdom, the term may be determined to carry some implicit preference for local results, specifically results local to the United Kingdom.

As described above, a term may have a degree of implicit local relevance with respect to each of multiple languages, each of multiple locales, or each of multiple language-locale combinations. The term may be evaluated for the local relevance criteria with respect to each of multiple languages, each of multiple locales, or each of multiple language-locale combinations to determine the degrees of implicit local relevance.

Figure 5:
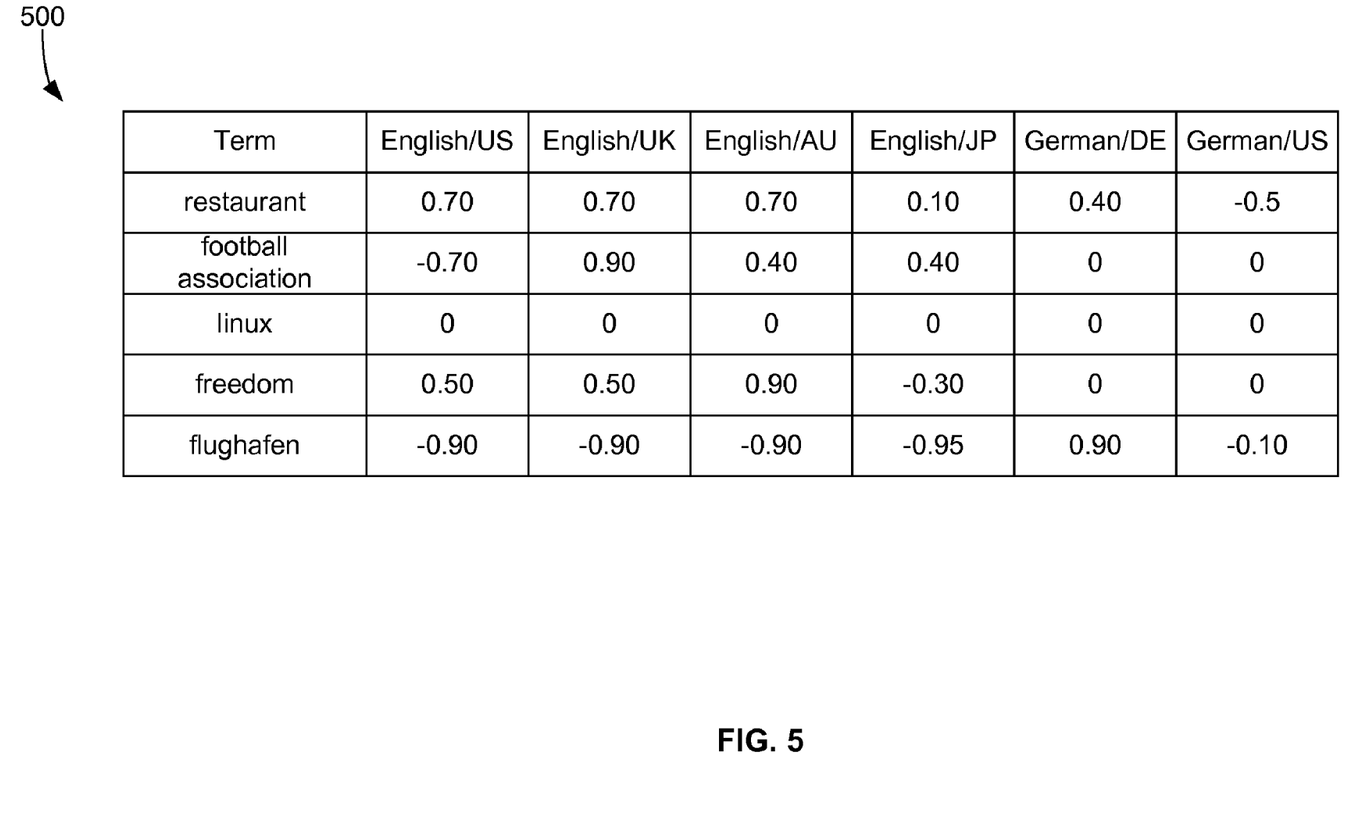
FIG. 5 is a diagram illustrating a data structure of a repository of terms and corresponding degrees of implicit local relevance.

FIG. 5 is a diagram illustrating a data structure 500 of a repository of terms and corresponding degrees of implicit local relevance. The data structure 500 of terms and corresponding degrees of implicit local relevance includes multiple terms and corresponding degrees of implicit local relevance. In the data structure 500, a term includes a degree of implicit local relevance with respect to each of multiple language-country combinations.

In the figure, the term "linux" has values of 0 for its degrees of implicit local relevance with respect to the language-locale combinations indicated. This indicates that the term "linux", when used in queries, has no implicit preference for local or non-local results. The term "flughafen" has negative values for the language-locale combinations that include English and the German-US combination, and a high positive value for German-DE (Germany). This indicates that the term carries a negative local preference (i.e., a preference for global results) in English speaking locales and even in the United States when the language is German, but carries a positive local preference (i.e., a preference for local results) in Germany.

Figure 6:
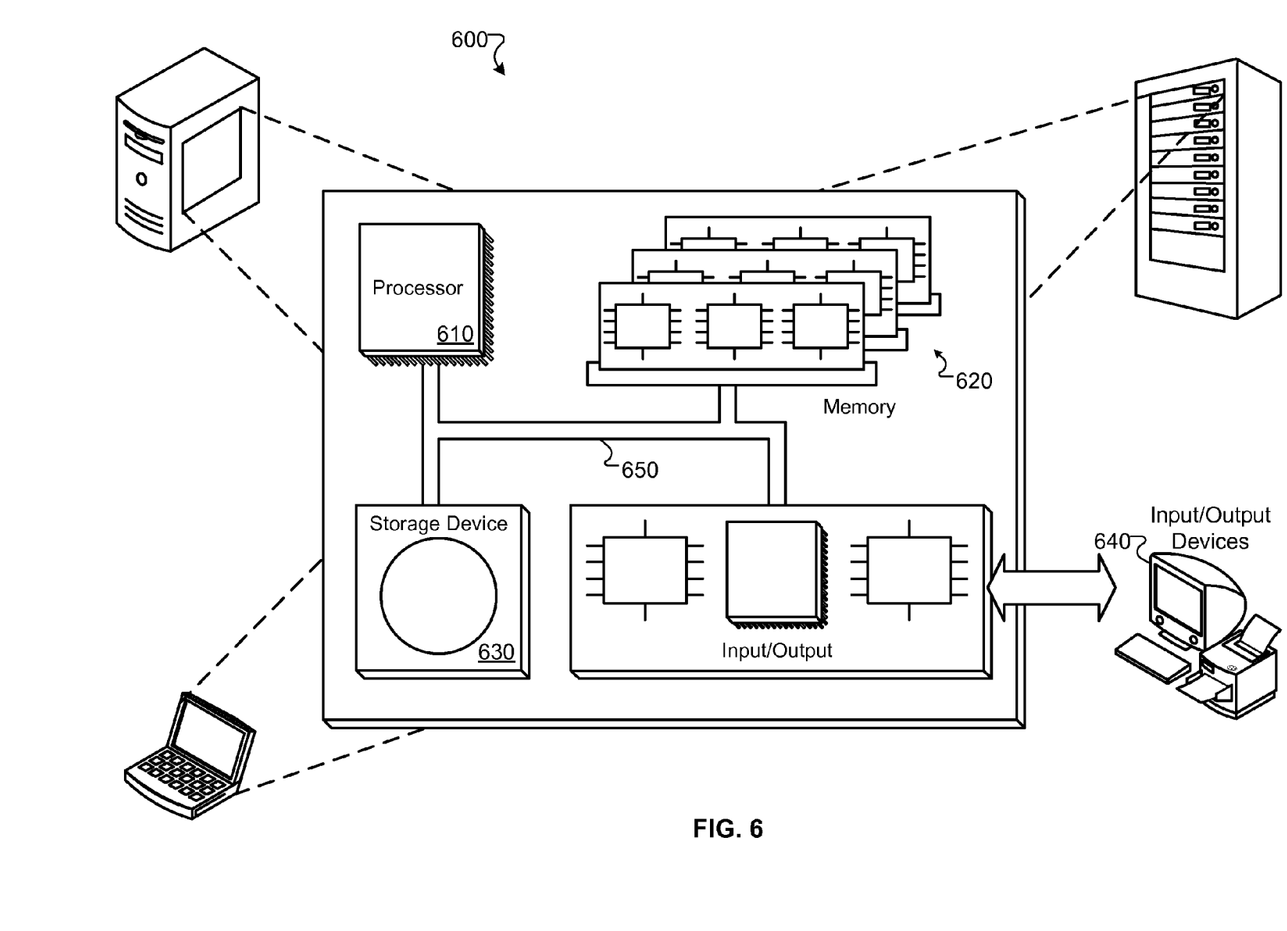
FIG. 6 is a schematic diagram illustrating a generic computer system.

FIG. 6 is a schematic diagram illustrating a generic computer system 600. The generic computer system 600 can be used for to perform operations described in association with process flows 300 and 400. The system 600 includes a processor 610, a memory 620, a storage device 630, and input/output devices 640. Each of the components 610, 620, 630, and 640 are interconnected using a system bus 650. The processor 610 is capable of processing instructions for execution within the system 600. Such executed instructions can implement one or more components of server 202, for example. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 is a computer readable medium such as volatile or non-volatile random access memory that stores information within the system 600. The memory 620 could store data structures representing term repository 216, and user click history 218, or query history 220 for example. The storage device 630 is capable of providing persistent storage for the system 600. The storage device 630 can be a floppy disk device, a hard disk device, an optical disk device, or a tape device, or other suitable persistent storage means. The input/output device 640 provides input/output operations for the system 600. In one implementation, the input/output device 640 includes a keyboard and/or pointing device. In another implementation, the input/output device 640 includes a display unit for displaying graphical user interfaces.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method comprising:
   receiving a query having one or more terms, the query associated with a user locale, the user locale indicating a locale associated with a user that submitted the query;
   determining, using one or more processors, a degree of implicit local relevance for the query with respect to each of one or more locales, where the degree of implicit local relevance is determined using one or more terms of the query that do not explicitly identify a locale and where the degree of implicit local relevance for the query identifies a combined degree to which each of the one or more terms of the query is relevant to the one or more respective locales;
   receiving one or more search results for the query, each search result having a respective score and a respective result locale; and
   modifying the score of a respective search result using the degree of implicit local relevance for the query, the user locale, and the respective result locale of the respective search result.

2. The method of claim 1, wherein determining a degree of implicit local relevance for the query comprises determining a degree of implicit local relevance for a group of one or more terms in the query.

3. The method of claim 2, wherein determining the degree of implicit local relevance for the group of one or more terms in the query comprises:
   matching a respective term in the group of one or more terms with a respective term in a repository of terms; and
   identifying a degree of implicit local relevance for the respective matched term.

4. The method of claim 3, wherein:
   the degree of implicit local relevance for the group of one or more terms is a degree of implicit local relevance for the group of one or more terms with respect to the user locale of the query; and
   the degree of implicit local relevance for the respective matched term is a degree of implicit local relevance for the respective matched term with respect to the user locale of the query.

5. The method of claim 3, wherein matching a term with a term in the repository comprises:
   changing the term into a canonical term; and
   matching the canonical term with a term in the repository.

6. The method of claim 1, wherein modifying the score of a respective search result using the degree of implicit local relevance for the query, the user locale, and the respective result locale of the respective search result comprises:
   increasing the score of a respective search result having a respective result locale matching the user locale of the query.

7. The method of claim 6, wherein increasing the score of a respective search result comprises:
   applying a score modifier to the score of the respective search result, wherein the amount of the score modifier is a function of the degree of implicit local relevance of the query.

8. The method of claim 1, where the degree of implicit local relevance for the query is with respect to a combination of the user locale and a language of a user interface from which the query was received.

9. A system, comprising:
   one or more processors; and
   instructions configured for execution by the one or more processors, the instructions comprising instructions to:
      receive a query having one or more terms, the query associated with a user locale, the user locale indicating a locale associated with a user that submitted the query;
      determine a degree of implicit local relevance for the query with respect to each of one or more locales, where the degree of implicit local relevance is determined using one or more terms of the query that do not explicitly identify a locale and where the degree of implicit local relevance for the query identifies a combined degree to which each of the one or more terms of the query is relevant to the one or more respective locales;
      receive one or more search results for the query, each search result having a respective score and a respective result locale; and
      modifying the score of a respective search result using the degree of implicit local relevance for the query, the user locale, and the respective result locale of the respective search result.

10. A computer-readable storage medium encoded with a computer program, the program comprising instructions that when executed by data processing apparatus cause the data processing apparatus to perform operations comprising:
    receiving a query having one or more terms, the query associated with a user locale, the user locale indicating a locale associated with a user that submitted the query;
    determining a degree of implicit local relevance for the query with respect to each of one or more locales, where the degree of implicit local relevance is determined using one or more terms of the query that do not explicitly identify a locale and where the degree of implicit local relevance for the query identifies a combined degree to which each of the one or more terms of the query is relevant to the one or more respective locales;

receiving one or more search results for the query, each search result having a respective score and a respective result locale; and modifying the score of a respective search result using the degree of implicit local relevance for the query, the user locale, and the respective result locale of the respective search result.

11. A system, comprising:

one or more processors configured to perform operations including:

receiving a query having one or more terms, the query associated with a user locale, the user locale indicating a locale associated with a user that submitted the query;

means for determining a degree of implicit local relevance for the query with respect to each of one or more locales, where the degree of implicit local relevance is determined using one or more terms of the query that do not explicitly identify a locale and where the degree of implicit local relevance for the query identifies a combined degree to which each of the one or more terms of the query is relevant to the one or more respective locales;

the one or more processors further configured to perform operations including:

receiving one or more search results for the query, each search result having a respective score and a respective result locale; and modifying the score of a respective search result using the degree of implicit local relevance for the query, the user locale, and the respective result locale of the respective search result.

12. A computer-implemented method comprising:

identifying a collection of terms, wherein the terms in the collection are terms identified from search queries;

determining, using one or more processors, a degree of implicit local relevance for each term in the collection with respect to each of one or more geographic locales, including evaluating each term in the collection with respect to one or more local relevance criteria and where the terms do not explicitly identify a locale; and storing the collection and the determined degrees of implicit local relevance in a repository;

wherein a degree of implicit local relevance for a respective term with respect to a locale indicates a correlation of search queries that include the respective term with search results that are directed to the locale.

13. The method of claim 12, wherein the local relevance criteria include whether users select local search results for queries having a respective term at a statistically significant rate.

14. The method of claim 12, wherein the local relevance criteria include whether queries for users combine a respective term with explicitly specified locales at a statistically significant rate.

15. The method of claim 12, wherein the local relevance criteria include whether users restrict, at a statistically significant rate, search results for queries that include a respective term to search results in domains corresponding to a specific locale.

16. The method of claim 12, wherein the local relevance criteria include whether, for queries that include the respective term, users transition at a statistically significant rate from general search results to local documents within a predefined number of transitions.

17. The method of claim 12, wherein determining a degree of implicit local relevance for a respective term with respect to each of one or more locales comprises:

determining, for the respective term, a degree of local relevance with respect to each of one or more language-country combinations.

18. The method of claim 12, wherein the collection of terms excludes terms that are names of locales.

19. A system, comprising:

one or more processors; and instructions configured for execution by the one or more processors, the instructions comprising instructions to:

identify a collection of terms, wherein the terms in the collection are terms identified from search queries;

determine a degree of implicit local relevance for each term in the collection with respect to each of one or more geographic locales, including instructions to evaluate each term in the collection with respect to one or more local relevance criteria and where the terms do not explicitly identify a locale; and store the collection and the determined degrees of implicit local relevance in a repository;

wherein a degree of implicit local relevance for a respective term with respect to a locale indicates a correlation of search queries that include the respective term with search results that are directed to the locale.

20. A computer-readable storage medium encoded with a computer program, the program comprising instructions that when executed by data processing apparatus cause the data processing apparatus to perform operations comprising:

identifying a collection of terms, wherein the terms in the collection are terms identified from search queries;

determining a degree of implicit local relevance for each term in the collection with respect to each of one or more geographic locales, including evaluating each term in the collection with respect to one or more local relevance criteria and where the terms do not explicitly identify a locale; and storing the collection and the determined degrees of implicit local relevance in a repository;

wherein a degree of implicit local relevance for a respective term with respect to a locale indicates a correlation of search queries that include the respective term with search results that are directed to the locale.

21. A system, comprising:

one or more processors configured to perform operations including:

identifying a collection of terms, wherein the terms in the collection are terms identified from search queries;

means for determining a degree of implicit local relevance for each term in the collection with respect to each of one or more geographic locales, including means for evaluating each term in the collection with respect to one or more local relevance criteria and where the terms do not explicitly identify a locale; and the one or more processors further configured to perform operations including storing the collection and the determined degrees of implicit local relevance in a repository;

wherein a degree of implicit local relevance for a respective term with respect to a locale indicates a correlation of search queries that include the respective term with search results that are directed to the locale.

* * * * *